United States Patent [19]

Tagawa

[11] Patent Number: 4,966,046
[45] Date of Patent: Oct. 30, 1990

[54] BICYCLE SPEED CHANGE LEVER ASSEMBLY

[75] Inventor: Koichi Tagawa, Kawachinagano, Japan

[73] Assignee: Maeda Industries, Ltd., Osaka, Japan

[21] Appl. No.: 362,365

[22] Filed: Jun. 5, 1989

[51] Int. Cl.⁵ .............................................. F16C 1/10
[52] U.S. Cl. ..................................... 74/502.2; 74/475; 74/489; 74/527
[58] Field of Search ...................... 74/502.2, 475, 527, 74/531, 523, 488, 489

[56] References Cited

U.S. PATENT DOCUMENTS

| | | | |
|---|---|---|---|
| 4,699,018 | 10/1987 | Tagawa | 74/475 |
| 4,736,651 | 4/1988 | Nagano | 74/475 X |
| 4,744,265 | 5/1988 | Nagano | 74/523 |
| 4,751,850 | 6/1988 | Nagano | 74/488 |
| 4,751,852 | 6/1988 | Nagano | 74/523 |
| 4,768,395 | 9/1988 | Tagawa | 74/489 |

*Primary Examiner*—Rodney M. Lindsey
*Attorney, Agent, or Firm*—William H. Eilberg

[57] ABSTRACT

A bicycle speed change lever assembly comprises a fixed support shaft, and a control lever pivotally supported on the support shaft and always subjected to a tension tending to pivot the lever in one direction. The lever has a boss portion housing a click ring formed with an arcuate series of clicking recesses. The click ring is co-rotatable with the lever boss portion. A ball is retained by a non-rotatable retainer disc in facing relation to the recess series. In one operational mode, the lever is given a rotational friction overcoming the tension, while the ball is backed up by a mode selector in a manner such that the ball comes into clicking engagement with the recess series with the capability of slight retreating movement.

20 Claims, 8 Drawing Sheets

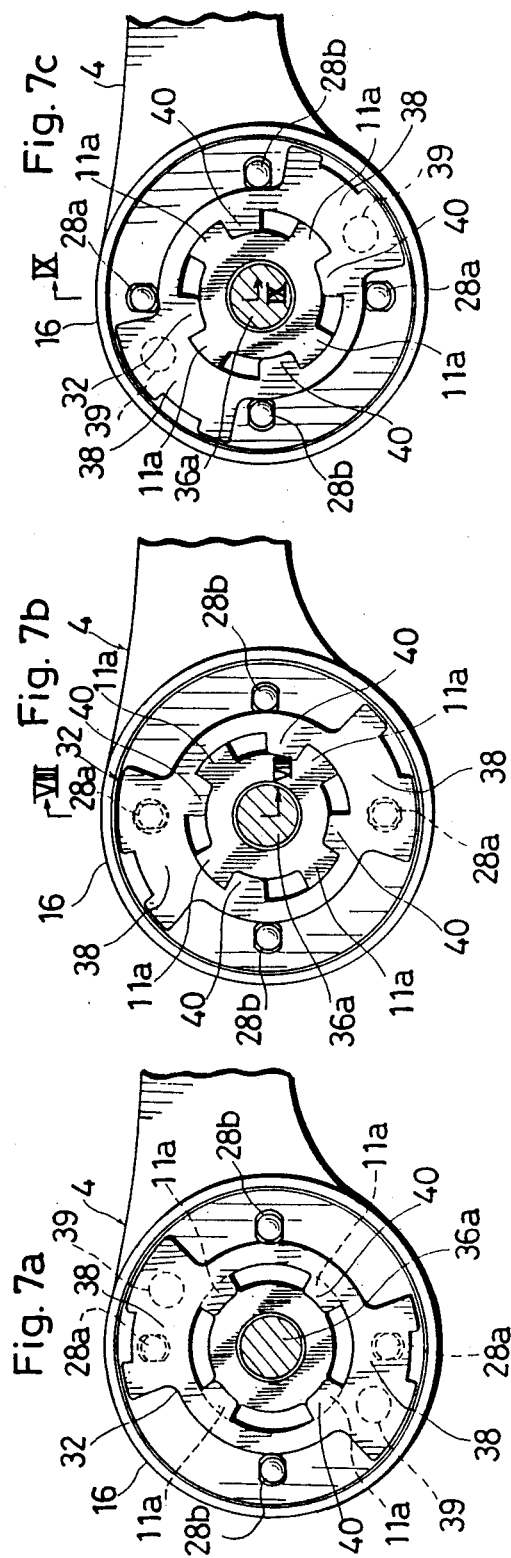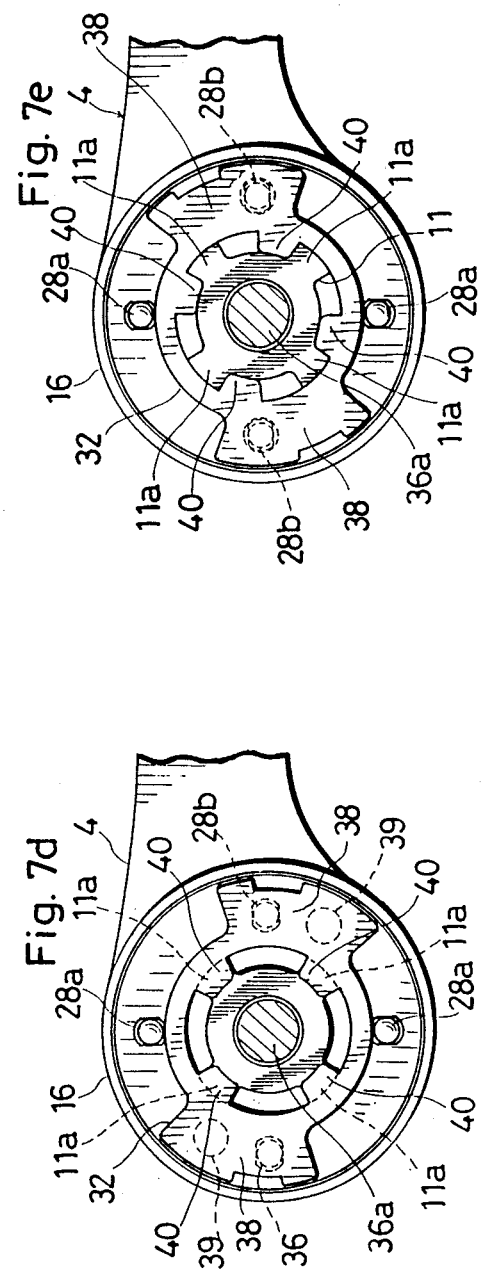

BICYCLE SPEED CHANGE LEVER ASSEMBLY

BACKGROUND OF THE INVENTION

1. Field of the Invention:

This invention relates to a bicycle speed change lever assembly, and more particularly to improvements in the lever assembly for operating a derailleur to shift a drive chain from one to another of diametrically different sprockets.

2. Prior Art:

As is well known, bicycles are equipped in many cases with a speed change mechanism to enable cycling suited to a particular road condition or to a cyclist's desire. One typical speed change mechanism includes for example a rear derailleur of the type that comprises a shiftable cage rotatably supporting a pair of guide pulleys in engagement with a drive chain, and a control mechanism such as a parallelogrammic linkage mechanism for displacing the cage laterally of the multiple freewheel (rear gear) to shift the drive chain from one sprocket to another of the freewheel. Another typical speed change mechanism includes a front derailleur which comprises a pair of parallel guide plates arranged on both sides of the drive chain, and a control mechanism such as a parallelogrammic linkage mechanism, similar to that of the rear derailleur, for displacing the guide plates laterally of a multiple chainwheel (front gear) to shift the drive chain from one sprocket to another of the chainwheel.

The movement of the shiftable cage or the guide plates is controlled by a control lever operatively connected to the parallelogrammic linkage mechanism via a control cable which is always subjected to a tension by a return spring incorporated into the linkage mechanism. The control lever has a boss portion rotatably supported on a support shaft fixed to a suitable part of the bicycle frame, so that the lever is pivotally operable. An end part of the control cable extends along a cable winding groove formed on the outer periphery of the lever boss portion which is imparted a rotational resistance or friction enough to overcome the tension of the cable. Thus, the lever may be frictionally held at any pivotal position against the tension of the cable.

When the control lever is manually pivoted, the control cable is wound up along the winding groove of the lever boss portion or paid out therefrom to vary the spanning length of the cable. As a result, the parallelogrammic linkage mechanism is correspondingly deformed to bring the shiftable cage or the guide plates to a lateral position determined by the pivotal position of the control cable.

Apparently, the friction type control lever is pivoted steplessly. It is thus quite difficult for an unskilled cyclist to properly operate the lever so as to bring the shiftable cage or the guide plates to an optimum position relative to each sprocket of the multiple freewheel or the multiple chainwheel. In fact, the cage or the guide plates may be erroneously brought to a position intermediate two adjacent sprockets, failing to conduct intended shifting of the drive chain. This gives rise to objectionable gear noises or unwanted vibrations of the drive chain.

In order to improve the maneuverability of the control lever, it has been proposed to incorporate into the lever a click mechanism which serves to clickingly hold the lever at each of predetermined pivotal positions, as disclosed for example in U.S. Pat. Nos. 4,744,265, 4,751,850, and 4,751,852 to Nagano. With the use of the click mechanism, any cyclist, skilled or unskilled, can easily operate the control lever to bring the shiftable cage or the guide plates accurately to an optimum position exactly corresponding to a selected sprocket of the multiple freewheel or the multiple chainwheel and thereby conduct desired speed change.

However, the proposed clicking type lever is not always advantageous and can sometimes become troublesome for example when the length of the control cable unexpectedly increases due to repeated use because such a cable elongation results in a positional deviation of the shiftable cage or the guide plates from an intended gear position corresponding to each clicked pivotal position of the lever. Although this positional deviation can be corrected by readjusting the cable length, such readjustment requires considerable time and skill.

The same problem also occurs when the multiple freewheel or the multiple chainwheel is replaced by another having the same number of sprockets at different spacing. In fact, multiple gears now commercially available include not only ones with constant spacing but also ones with varying sprocket spacing. The clicking mechanism, on the other hand, provides clicking positions only at fixed spacing, and it is impossible to hold the lever at a pivotal position between two adjacent clicking positions because of insufficient friction.

According to the three U.S. patents mentioned above, it is possible to switch between a frictional mode and a click mode by operating a changeover mechanism. In the frictional mode, the control lever can be held at any pivotal position by a rotational friction which is large enough to overcome the tension of the control cable. This frictional mode is advantageous in that the pivotal position of the control lever can be adjusted in any way to properly control the derailleur even at the time of cable elongation or after gear replacement. In the click mode, the lever, which is now free of strong rotational friction, is held only at predetermined pivotal positions by clicking engagement which is strong enough to overcome the tension of the control cable. The cyclist is thus allowed to enjoy the benefits of both operational modes depending on his or her own selection. However, it is impossible to enjoy the benefits of both operational modes at the same time.

U.S. Pat. Nos. 4,699,018 and 4,768,395 to Tagawa (the inventor of the present invention) also disclose a bicycle lever assembly which enables similar selection between a frictional mode and a clicking mode.

SUMMARY OF THE INVENTION

It is, therefore, an object of the present invention to provide a bicycle speed change lever assembly which allows the cyclist to enjoy the benefits of the frictional mode and the click mode at the same time, i.e., in one operational mode.

Another object of the present invention is to enable fine adjustment in the pivotal position of the control lever at each clicking position.

A further object of the present invention is to enable additional selection of the frictional mode wherein overshifting pivotal movement of the lever is possible.

Still another object of the present invention is to enable selection between two different clicking modes.

Still further object of the present invention is to enable selection between two different clicking patterns.

According to one aspect of the present invention, there is provided a bicycle speed change lever assembly comprising: a support shaft; a control lever pivotally supported by the support shaft and always subjected to a tension tending to pivot the lever in one direction, the lever including a boss portion having a bore for rotatably fitting around the support shaft, the lever further including an arm portion extending radially outward from the boss portion; a click member substantially co-rotatable with the boss portion, the click member being formed with at least one arcuate series of clicking recesses; at least one rolling element held by retainer means in facing relation to the series of clicking recesses, the retainer means being substantially non-rotatable relative to the support shaft; backup means arranged for backing up the rolling element on one side of the retainer means away from the click member, the backup means being capable of allowing limited retreating movement of the rolling element toward the backup means but preventing the rolling element from retreating out of clicking engagement with the series of clicking recesses; and friction imparting means capable of imparting to the boss portion of the lever a rotational friction enough to overcome the tension.

According to another aspect of the present invention, there is provided a bicycle speed change lever assembly comprising: a support shaft; a click member supported by the support shaft and formed with at least one arcuate series of clicking recesses; retainer means supported by the support shaft and holding at least one rolling element in facing relation to the series of clicking recesses; a control lever pivotally supported by the support shaft and always subjected to a tension tending to pivot the lever in one direction, pivotal movement of the lever causing relative rotation between the click member and the retainer means; backup means arranged for backing up the rolling element on one side of the retainer means away from the click member, the backup means allowing limited retreating movement of the rolling element toward the backup means but preventing the rolling element from retreating out of clicking engagement with the series of clicking recesses; and friction imparting means capable of imparting to the lever a rotational friction enough to overcome the tension.

According to the present invention, the lever can be frictionally held at any pivotal position, while it is also possible to generate click sounds or feel at predetermined pivotal positions of the lever. The clicking engagement between the rolling element and the arcuate series of clicking recesses is weakened because the rolling element is allowed to retreat slightly toward the backup means. Thus, the combination of the rotational friction with the clicking engagement will not result in an unacceptable increase in the overall rotational resistance given to the lever, consequently ensuring easy pivotability (ready operability) of the lever.

Other objects, features and advantages of the present invention will be fully understood from the following detailed description given with reference to the accompanying drawings.

BRIEF DESCRIPTION OF THE DRAWINGS

In the accompanying drawings:

FIGS. 7a to 7e are sectional views showing various positions of a mode selector incorporated in the lever assembly.

DETAILED DESCRIPTION

Figure 1:
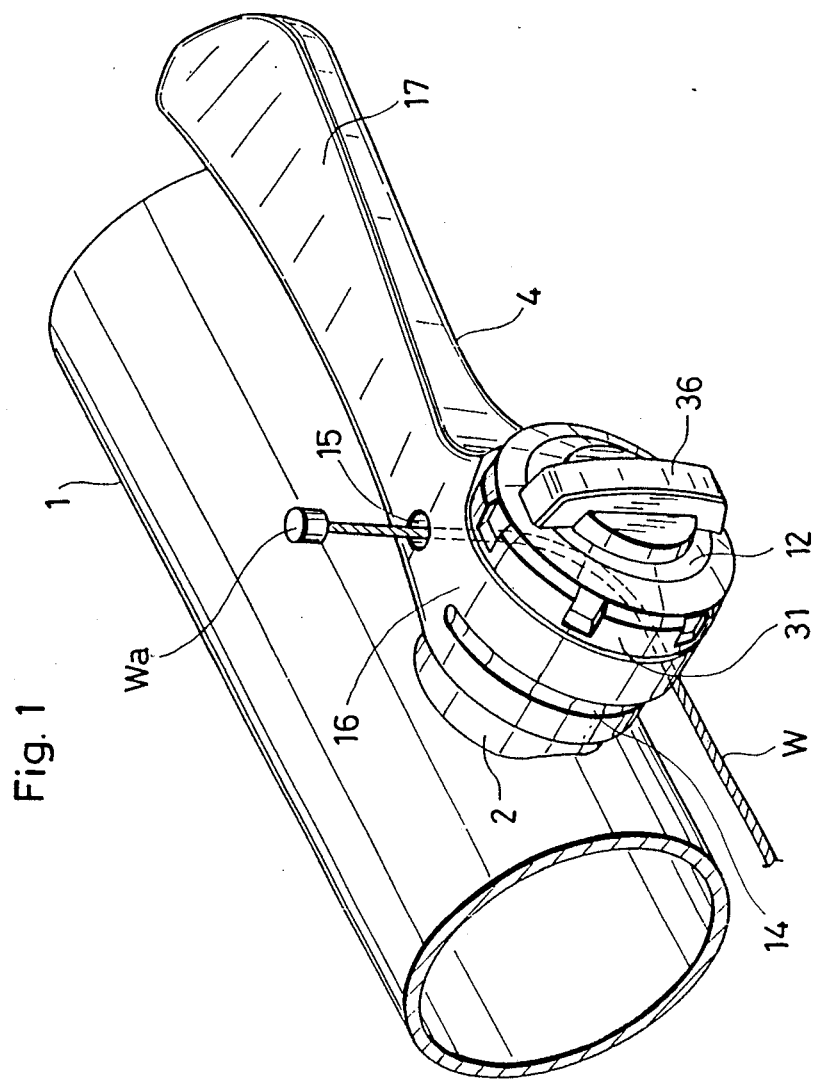
FIG. 1 is an overall perspective view showing a bicycle speed change lever assembly embodying the present invention.
Figure 2:
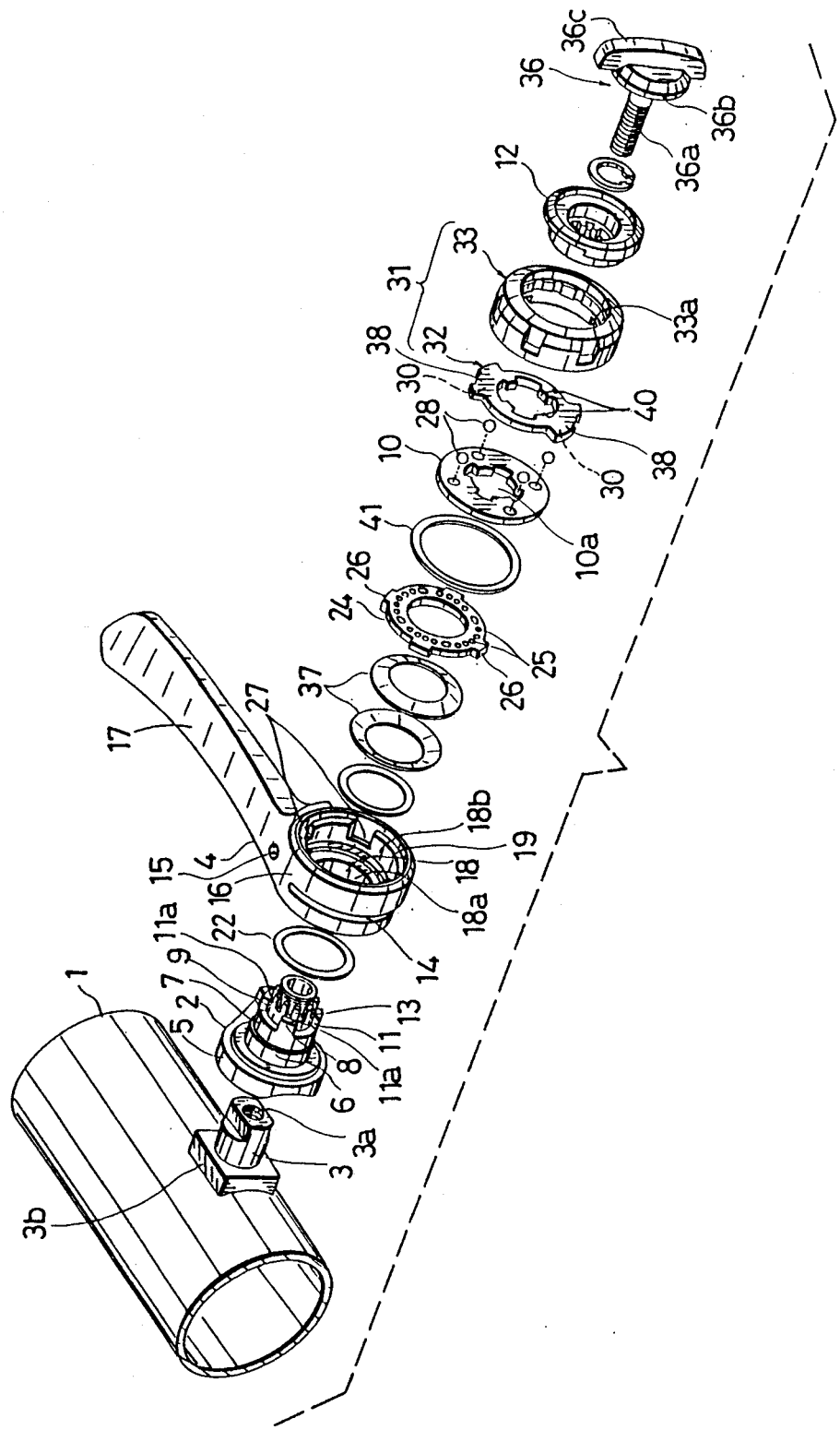
FIG. 2 is an exploded perspective view of the lever assembly.
Figure 3:
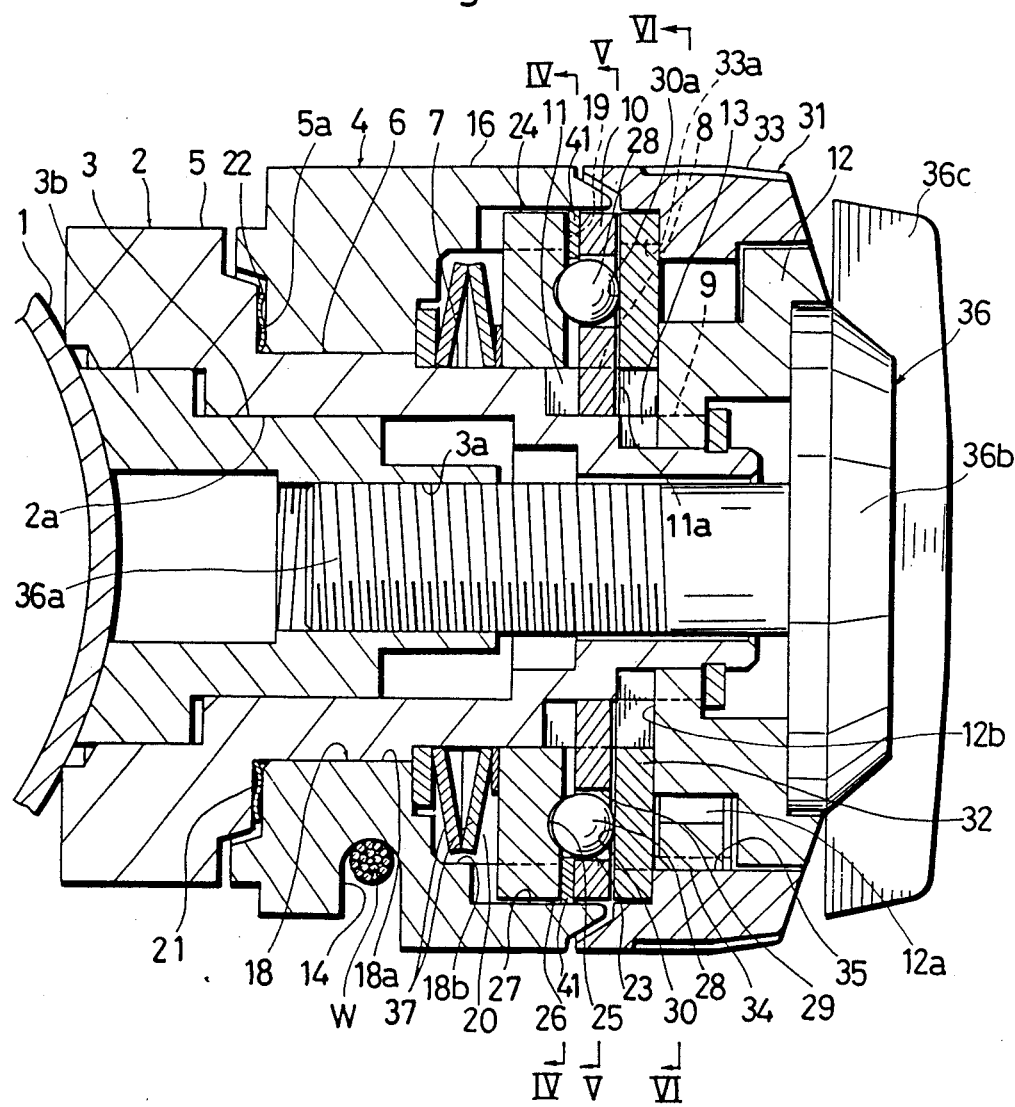
FIG. 3 a sectional view showing the assembled interior structure of the lever assembly in one operational mode.

Referring now to FIGS. 1 to 3 of the accompanying drawings, a bicycle speed change lever assembly according to the present invention is illustrated as having a control lever 4 which is pivotally mounted on a support shaft 3 via an intervening lever mount 2. The support shaft 3 has a rectangular base portion 3b which is rigidly secured to a suitable part 1, such as a down tube, of the bicycle frame directly by brazing or indirectly by means of a known clamp band (not shown). The shaft 3 is further formed with a threaded axial bore 3a.

As shown in FIGS. 2 and 3, the lever mount 2 has a stepped through-bore 2a for fitting over the support shaft 3. Specifically, the stepped bore of the lever mount includes a rectangular bore portion for engagement with the rectangular base portion 3b of the support shaft. Thus, the lever mount is non-rotatable relative to the support shaft.

The exterior of the lever mount 2 also has a stepped configuration which diametrically reduces from one end to the other. Formed at the one end of the lever mount is a flange portion 5 in which the rectangular bore portion described above is formed. The flange portion is followed by a first cylindrical portion 6 which in turn is followed by a second cylindrical portion 7. Further following the second cylindrical portion is a first splined portion 8 which includes splines 11 each providing an end face 11a. Terminating generally at the other end of the lever mount is a second splined portion 9 including spines 13.

The control lever 4 comprises a boss portion 16 and an arm portion 17 extending radially outward therefrom. The boss portion is externally formed with a circumferential groove for guiding a control cable W. The control cable is formed at one end with an engaging head Wa which is anchored in a bottomed hole 15 of the boss portion (see FIG. 1). The other end of the control cable is connected for example to a known rear derailleur (not shown) which includes a shiftable cage movable laterally relative to a multiple freewheel or gear. A tension is always applied to the control cable by a return spring incorporated in the deraileur. Thus, when the lever 4 is pivoted to wind up or pay out the control cable, the shiftable cage of the deraileur displaces laterally to shift an unillustrated drive chain from one sprocket to another of the freewheel, thereby conducting an intended speed change. Alternatively, the control cable may be connected to a known front deraileur (not shown) for shifting the drive chain from one sprocket to another of a multiple front gear.

The boss portion 16 of the control lever 4 has a stepped central bore 18 consisting of a smaller diameter bore portion 18a and a larger diameter bore portion 18b. The smaller diameter bore portion is fitted on the first cylindrical portion 6 of the lever mount 2, so that the control lever is pivotable about the lever mount. On the other hand, the larger diameter bore portion cooperates with the lever mount to define an annular space 20 for accommodating a click mechanism 23, as described hereinafter. Indicated at 22 is a spring washer interposed between an annular side wall 5a of the mount flange 5 and an annular end wall 21 of the lever boss portion.

The click mechanism 23 comprises a click member 24 which is in the form of a ring according to the illustrated example. The click ring 24 is rotatably and axially slidably supported on the second cylindrical portion 7 of the lever mount 2 within the annular space 20. The click ring 24 is always biased axially outward by a pair of discal springs 37.

Figure 4:
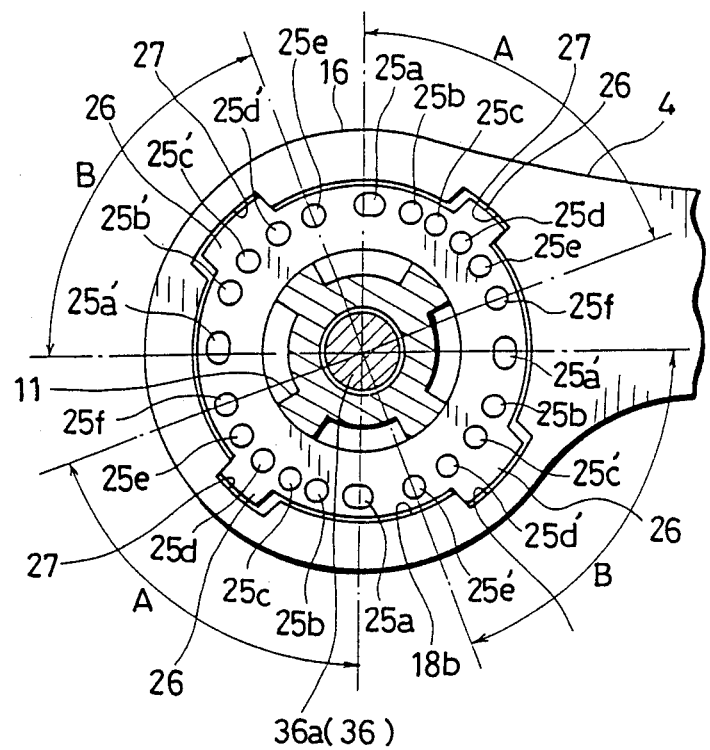
FIG. 4 is a sectional view taken on lines IV—IV in FIG. 3.

As better shown in FIG. 4, the outer circumference of the click ring 24 is formed with engaging tongues 26, whereas the larger diameter bore portion 18 of the lever boss 16 is formed with a corresponding number of engaging grooves 27 for receiving the respective engaging tongues. Each engaging groove is slightly larger in circumferential length than a corresponding tongue. Thus, the lever boss is substantially co-rotatable with the click ring but rotatable relative thereto within a limited angular range of 5° for example. This slight relative rotation between the lever boss and the click ring enables overshifting pivotal movement of the control lever 4, as explained hereinafter.

As also shown in FIG. 4, the outwardly directed side face of the click ring 24 is formed with four groups of clicking recesses 25a–25f, 25a'–25e' arranged in four angularly displaced zones A, B. Two zones A are diametrically opposite, and respectively contain six clicking recesses 25a–25f in an arcuate series and in an identical arrangement (in point symmetry with respect to the rotational center of the click ring) to provide six stage speed change. The remaining two zones B are also diametrically opposite, and respectively contain five clicking recesses 25a'–25e' in an arcuate series and in an identical arrangement to provide five stage speed change.

Figure 5:
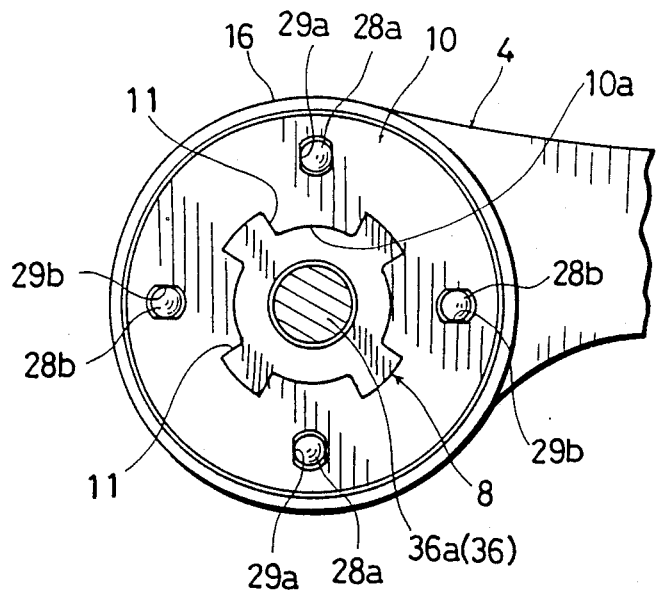
FIG. 5 is a sectional view taken along lines V—V in FIG. 3.

The click mechanism 23 further incorporates a retainer 10 disposed axially outwardly of the click ring 24. The retainer, which is in the form of a disc according to the illustrated example, has a central opening 10a suitably notched for non-rotatable mounting to the first splined portion 8 of the lever mount 2, as illustrated in FIG. 5.

The outer peripheral portion of the retainer disc 10 is formed with four equiangularly spaced holes 29a, 29b for loosely receiving balls 28a, 28b in corresponding relation to the respective series of clicking recesses 25a–25f, 25a'–25e'. The diameter of the balls is larger than the wall thickness of the retainer. If desired, the balls may be replaced by rollers (not shown).

Axially outwardly of the retainer disc 10 is arranged a mode selector 31 which is lockably rotatable to back up a selected pair of balls 28a or 28b into clicking engagement with corresponding series of clicking recesses 25a–25f or 25a'–25e'. According to the illustrated example, the mode selector comprises a control plate 32 and an operating ring 33.

Figure 6:
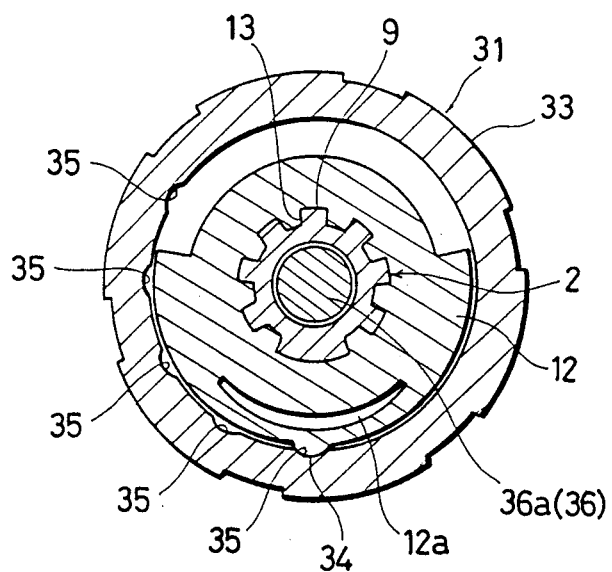
FIG. 6 is a sectional view taken on lines VI—VI in FIG. 3.

The operating ring 33 of the mode selector 31 is rotatably supported on a presser member 12 which, in turn, is non-rotatably mounted on the second splined portion 9 of the lever mount 2 (see FIG. 3). As shown in FIG. 6, the presser member 12 is externally formed with a positioning protrusion 34, whereas the operating ring 33 is internally formed with a plurality of positioning recesses 35 for engagement with the positioning protrusion. The positioning protrusion is rendered elastically displaceable radially by taking away a wall portion 12a from the presser member, so that the operating ring 33 is clickingly rotatable and lockable relative to the presser member. The angular spacing between the engaging recesses 35 may be about 30°.

The presser member 12 has an end face 12b in pressing contact with the control plate 32 (see FIG. 3). This control plate is externally formed with a diametrically opposite pair of ears 38, whereas the operating ring 33 is internally formed with a diametrically opposite pair of cutouts 33a for receiving the ears 38 of the control plate. Thus, the control plate is co-rotatable with the operating ring.

According to the illustrated example, each ear 38 of the control plate 32 is generally sector-shaped with a sector angle of about 60°. The ear 38 serves to back up a selected ball 28 (28a or 28b). More specifically, the backup ear 38 provides a backup surface 30 on its side facing the ball. The backup surface 30 comprises a normal surface portion 30a (see FIG. 3) and a retreated surface portion 30b (see FIG. 8). The retreated surface portion 30b is provided by the bottom of a relatively shallow recess 39 formed in the normal surface portion 30a. Thus, the backup ear 38 can back up the ball in two different ways, as more clearly described hereinafter.

The control plate 32 has a central opening formed with a plurality of inward tongues 40 corresponding in shape and arrangement to the end faces 11a of the respective splines 11 of the lever mount 2. When the control plate 32 together with the operating ring 33 assumes one of the positions shown in FIG. 7a and 7d, the inward tongues 40 exactly coincide with the spline end faces 11a, so that the control plate is prevented from axially displacing onto the first splined portion B of the lever mount. On the other hand, when the control plate assumes a further position shown in FIG. 7b, 7c or 7e, the control plate can axially move onto the first splined portion 8 of the lever mount. The purpose of such axial displacement of the control plate or the mode selector will be described hereinafter.

A ring washer 41 is interposed between the click ring 24 and the retainer disc 10, as illustrated in FIGS. 2 and 3. This ring washer can come into frictional contact with the lever boss portion 16 at 19.

The lever mount 2, the control lever 4, the click mechanism 23 and the mode selector 31 are held in place relative to the support shaft 3 by means of a clamping bolt 36. This bolt includes a threaded shank 36a screwed into the threaded bore 3a of the support shaft, a head 36b in pressing contact with the presser member 12, and an operating knob 36c for facilitating rotation of the bolt. The operating ring 33 together with the control plate 32 can be manually rotated upon slight loosening of the bolt 36 but rotationally locked upon re-tightening thereof, thereby selecting a desired operational mode. Such mode selection can be correctly carried out by clicking engagement between the engaging protrusion 34 and the engaging recesses 35 at every 30° rotation of the operating ring 33.

The bicycle speed change lever assembly described above operates in the following manner.

It is now assumed that the mode selector 31 takes the position shown in FIG. 7a. In this condition, the normal backup surface portions 30a of the ears 38 of the control plate 32 are held in abutment with the two balls 28a only whereas the remaining two balls 28b are held clear of the control plate 32 without any backup (see also FIG. 9). Thus, the balls 28a only are brought into clicking engagement with the corresponding series of clicking recesses 25a–25f (see FIG. 4) in the diametrically opposite zones A.

On the other hand, the inward tongues 40 of the control plate 32 are in positional coincidence with the spline end faces 11a of the lever mount, whereby the control plate is prevented by the spline end faces 11a from axially moving onto the first splined portion 8 of the lever mount even if the clamping bolt 36 is tightened up. In other words, an axial pressing force applied to the presser member 12 upon tightening of the clamping bolt is all born by the lever mount 2 and does not result in increase of friction with respect to the lever boss portion 16.

The retainer disc 10 is non-rotatable, so that the backed-up balls 28a remain in fixed circumferential positions. Thus, when the click ring 24 is rotated counterclockwise in FIG. 4 by pivoting the control lever 4 in the same direction, the backed-up balls successively come into clicking engagement with the clicking recesses 25a–25f. This clicking engagement is enough to overcome the tension applied to the control cable W. As a result, the control lever 4 can be held at any selected one of the six click positions which correspond to the six different sprocket positions of a six-stage freewheel.

The engaging tongues 26 of the click ring 24 are smaller in circumferential length than the engaging grooves 27 of the lever boss portion 16, as described before and as shown in FIG. 4. Thus, the control lever 4 is pivotable slightly relative to the click ring 24 to enable overshifting when each ball 28a is in clicking engagement with a particular one of the clicking recesses 25a–25f. The thus overshifted lever will automatically return to its proper position under the tension of the control cable W upon freeing the lever because the frictional resistance imparted to the lever is insufficient to overcome the tension of the control cable. This overshifting pivotal movement of the control lever is advantageous for more reliably shifting the drive chain from one sprocket to another of the multiple freewheel.

The operational mode shown in FIG. 7a is hereafter called "non-frictional, normal click mode" or more simply "normal click mode". The term "non-frictional" used here should be understood that the frictional resistance imparted to the control lever 4 is insufficient to overcome the tension applied to the control cable W, but not that the control lever is subjected to no friction.

The mode selector 31 may be rotated by 30° from the FIG. 7a position to the position shown in FIG. 7b. In this position, the ears 38 of the control plate 32 back up the balls 28a at the shallow recesses 39 or the retreated surface portions 30b (see also FIG. 8). The shallow recesses 39 allow slight retreating movement of the balls 28a but prevent them from completely coming out of contact with the click ring. Thus, the balls 28a can still come into clicking engagement with the corresponding series of clicking recesses 25a–25f, but such clicking engagement is weaker than the normal clicking engagement previously described. The other balls 28b remain in the non-backed-up condition (see also FIG. 9) and are thus allowed to retreat completely out of contact with the click ring.

Figure 8:
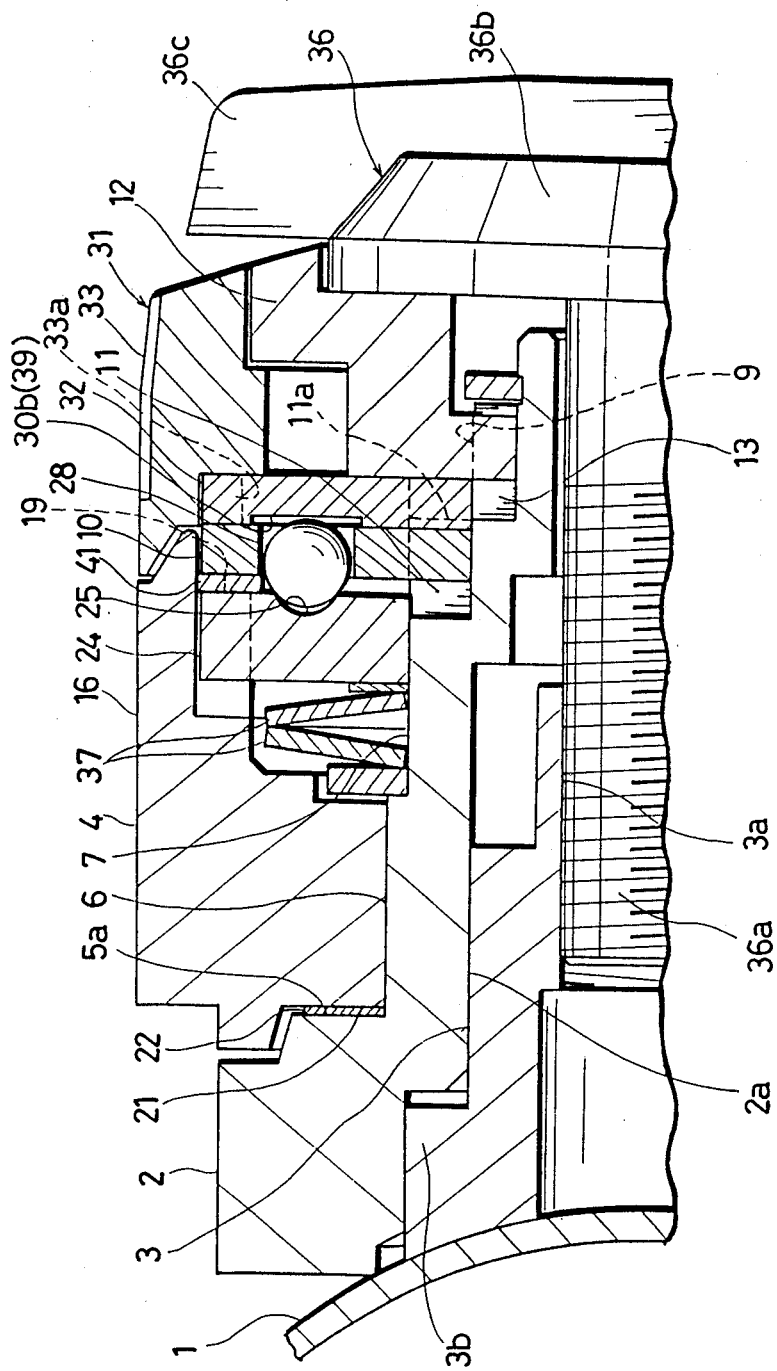
FIG. 8 is a sectional view taken on lines VIII—VIII in FIG. 7b.

On the other hand, the inward tongues 40 of the control plate 32 are now clear of the spline end faces 11a. Thus, the control plate can slidably advance onto the first splined portion 8 of the lever mount 2 upon tightening the clamping bolt 36, as shown in FIG. 8. Such axial movement of the control plate 32 presses the retainer disc 10 axially inward, so that the ring washer 41 is brought into pressing contact with the frictional surface portions 19 of the lever boss 16. In this way, the frictional resistance imparted to the lever boss is increased enough to overcome the tension of the control cable W without the help of the clicking engagement. In the FIG. 7b operational mode, which is hereafter called "frictional, half-click mode" or simply "half-click mode", the control lever 4 may be pivoted with successive clicking engagement between the backed-up balls 28a and the corresponding series of clicking recesses 25a–25f. The clicking sounds (or feel) will help to correctly bring the control lever to a pivotal position corresponding to a selected sprocket of the unillustrated six-stage freewheel. Thus, this operational mode still enables the cyclist to enjoy the benefit of the click mechanism 23.

Further, in the half-click mode, the frictional resistance imparted to the control lever 4 is sufficient to overcome the tension of the control cable W. Thus, the control lever, which is brought at a particular clicking position, may be pivoted slightly further within the range allowed by the backlash between the engaging tongues 26 and the engaging grooves 27 (see FIG. 4), and frictionally held there. Such pivotal adjustment of the control lever is particularly advantageous to appropriately position the unillustrated deraileur when the control cable W (see FIG. 1) is unexpectedly elongated after repeated use, or when the existing six-stage freewheel is replaced by another six-stage freewheel having slightly different sprocket spacing. In this case, the weaker clicking engagement will give approximate positions, thereby assisting greatly in subsequent correction.

Still further, the control lever 4 may be frictionally held at any pivotal position regardless of the clicking engagement between the click ring 24 and the backed-up balls 28a. For example, the lever may be held intermediate two adjacent clicking positions. In this case, it is possible to correctly position the unillustrated deraileur relative to the multiple freewheel even when the control cable W has suffered a relatively large elongation.

It should be appreciated that the clicking engagement obtained in the half-click mode is relatively weak, as described above. Therefore, such clicking engagement will not unacceptably increase the rotational resistance of the control lever 4 which is already subjected to a relatively large friction.

FIG. 7c shows an operational mode obtained by 30° rotation of the control plate 32 from the FIG. 7b position. In this operational mode, the backup ears 38 of the control plate back up none of the balls 28a, 28b, whereas the inward tongues 40 of the control plate are located clear of the spline end faces 11a. Again, the control plate can slidably advance onto the first splined portion 8 of the lever mount 2 upon tightening the clamping bolt 36, as shown in FIG. 8. Such axial movement of the control plate causes the retainer disc 10 to move axially inward, so that the ring washer 41 comes into pressing contact with the frictional surface portions 19 of the lever boss 16. Therefore, the frictional resistance imparted to the lever boss is increased enough to overcome the tension of the control cable W.

Figure 9:
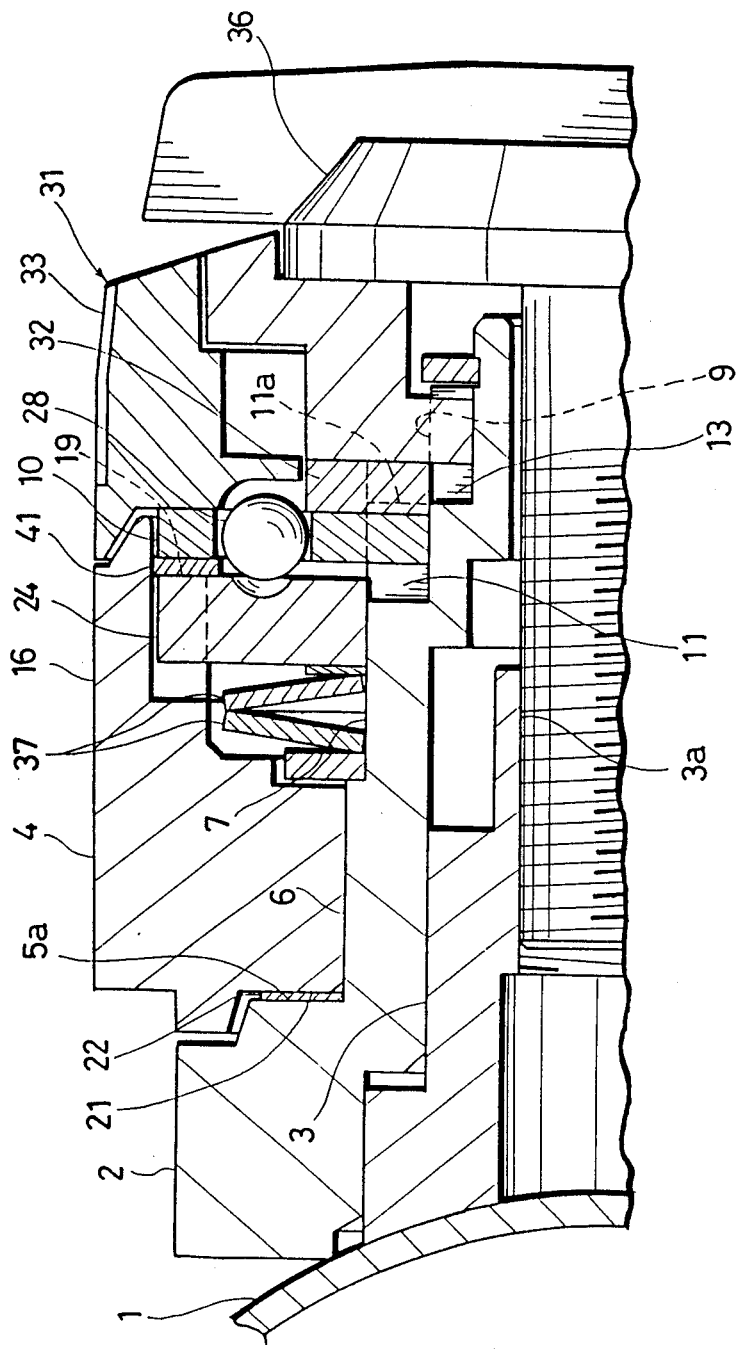
FIG. 9 is a sectional view taken on lines IX—IX in FIG. 7c.

In the FIG. 7c operational mode, which is hereafter termed "normal frictional mode", no clicking engagement is provided because all of the balls 28 are allowed to retreat completely out of pressing contact with the click ring 24, as shown in FIG. 9. Instead, the control lever 4 may be pivoted to and frictionally held at any angular position.

The mode selector 31 may be further rotated by 30° to assume the operational mode illustrated in FIG. 7d. In this mode, the normal surface portions 30a of the control plate 32 fully back up the balls 28b in clicking engagement with the corresponding series of clicking recesses 25a'-25e' (FIG. 4), while the other balls 28a are allowed to retreat completely out of abutment with the click ring 24 (FIG. 9). Again, the inward tongues 40 of the control plate coincide in position to the spline end faces 11a, so that the control plate is prevented from axially advancing onto the first splined portion 8 of the lever mount 2 even if the clamping bolt 36 is strongly tightened up. Thus, the frictional resistance alone of the control lever 4 is insufficient to overcome the tension of the control cable W.

The operational mode shown in FIG. 7d is also "non-frictional, normal click mode" wherein the click mechanism 23 provides five clicking positions corresponding to a five-stage multiple freewheel. The backlash between the engaging tongues 26 of the click ring 24 and the engaging grooves 27 of the lever boss portion 16 enables overshifting pivotal movement of the control lever 4 at any clicking position thereof, as described with reference to FIG. 7a.

FIG. 7e represents a further operational mode which is obtained by turning the control plate 32 by 30° from the FIG. 7d position. In this mode, the ears of the control plate 32 support the balls 28b at the shallow recesses 39 or the retreated surface portions 30b (FIG. 8), whereas the other balls 28a remain completely retreatable out of abutment with the click ring 24 (FIG. 9). Thus, upon pivotal movement of the control lever 4, the half-backed-up balls 28b successively come into weakened engagement with the corresponding series of clicking recesses 25a'-25e' to provide five click positions for the five-stage freewheel.

On the other hand, the inward tongues 40 of the control plate 32 are out of alignment with the spline end faces 11a, so that the control plate axially advances onto the first splined portion 8 of the lever mount 2 to impart increased frictional resistance to the lever boss portion 16 by way of the ring washer 41 (FIG. 8). Thus, the frictional resistance of the control lever 4 becomes enough to overcome the tension of the control cable W.

Obviously, the operational mode ("frictional, half-click mode") shown in FIG. 7e is similar to the one shown in FIG. 7b. Therefore, the same advantages as described with reference to FIG. 7b are also obtainable in the operational mode of FIG. 7e.

To sum up, the bicycle speed change lever assembly according to the illustrated embodiment provides the following operational modes.

(1) Non-frictional, normal click mode which provides six clicking positions with the capability of overshifting.
(2) Frictional, half-click mode which provides weakened six-stage clicking engagement with the capability of frictionally holding the control lever at any pivotal position.
(3) Normal frictional mode wherein the control lever can be frictionally held at any pivotal position without any click.
(4) Non-frictional, normal click mode which provides five clicking positions with the capability of overshifting.
(5) Frictional, half-click mode which provides weakened five-stage clicking engagement with the capability of frictionally holding the control lever at any pivotal position.

The most important feature of the present invention resides in the provision of the frictional, half-click mode. In this operational mode, it is possible to frictionally hold the control lever 4 at any pivotal position while enjoying the benefit of the clicking engagement. Thus, the half-click mode can fully take the place of the normal frictional mode as well as the normal click mode. Further, the half-click mode is also advantageous in that the clicking engagement may be weakened enough to ensure easy pivotal movement of the control lever by properly adjusting the depth of the shallow recesses 39. Thus, the half-click mode is completely beyond a simple combination of the normal frictional mode and the normal click mode because such combination unacceptably deteriorates rotatability or pivotability of the control lever.

According to the illustrated embodiment, the mode selector 31 is operable to switch between the six-stage clicking pattern and the five-stage clicking pattern. However, it is possible to provide only one clicking pattern having an number of clicking stages. Further, the normal frictional mode may be dispensed with because the half-click mode can provide substantially the same function.

The control plate 32 should be preferably designed to back up two balls 28a or 28b at a time for balancing purposes. However, the control plate may be configured to back up only one ball at a time if so desired.

As obviously understood from the foregoing description, the control plate 32 of the mode selector 31 rotates and axially moves together with the operating ring 33. Thus, the control plate may be formed integral with the operating ring.

According to the illustrated embodiment, the engaging tongues 26 of the click ring 24 are received in the engaging grooves 27 of the lever boss portion 16 with a backlash (see FIG. 4), thereby producing an pivotal play of the control lever 4. This pivotal play, though not essential for the invention, is preferred to enable overshifting (in the non-frictional, normal click mode) or slight positional correction (in the frictional, half-click mode) for e.g. compensation of the cable elongation. In fact, a similar pivotal play of the control lever may be also obtained by any one of the following alternative arrangements.

(a) The clicking recesses 25 are circumferentially elongated. In FIG. 4, four of the clicking recesses are shown at 25a and 25a' as thus elongated.
(b) Each peripheral hole 29a, 29b of the retainer disc 10 (FIG. 5) is circumferentially elongated.

(c) The central opening of the retainer disc 10 (FIG. 5) is notched so that the disc is rotatable within a small range relative to the first splined portion 8 of the lever mount 2.

The speed change lever assembly according to the present invention may also be modified so that the click member or ring is made non-rotatable relative to the support shaft, whereas the ball retainer disc is made co-rotatable with the boss portion of the control lever. In this case, the mode selector or backup member is also made co-rotatable with the lever boss portion. Similarly to the illustrated embodiment, the backup member provides at least one backup surface which includes a normal surface portion and a retreated surface portion. The retreated surface portion is used for enabling the half-click mode, as already described. The backup member, which must be made co-rotatable with the lever boss portion during speed change operation, may be rendered rotatable relative to the lever boss portion by loosening a threaded presser member screwed to the lever boss portion. Thus, the backup member may be rotationally adjusted to provide an operational mode (e.g. the normal click mode) other than the half-click mode. The threaded presser member may be also used to impart friction to the lever boss portion during the half-click mode (or the normal frictional mode).

The present invention being thus described, it is obvious that the same may be varied in many other ways. Such variations are not to be regarded as a departure from the spirit and scope of the invention, and all such modifications as would be obvious to those skilled in the art are intended to be included within the scope of the following claims.

I claim:

1. A bicycle speed change lever assembly comprising:
   a support shaft;
   a control lever pivotally supported by said support shaft and always subjected to a tension tending to pivot said lever in one direction, said lever including a boss portion having a bore for rotatably fitting around said support shaft, said lever further including an arm portion extending radially outward from said boss portion;
   a click member substantially co-rotatable with said boss portion, said click member being formed with at least one arcuate series of clicking recesses;
   at least one rolling element held by retainer means in facing relation to said series of clicking recesses, said retainer means being substantially non-rotatable relative to said support shaft;
   backup means arranged for backing up said rolling element on one side of said retainer means away from said click member, said backup means being capable of providing a half-click mode wherein said backup means allows said rolling element to limitatively retreat from said series of clicking recesses while also preventing said rolling element from retreating out of clicking engagement with said series of clicking recesses; and
   friction imparting means capable of imparting to said boss portion of said lever a rotational friction enough to overcome said tension.

2. The lever assembly as defined in claim 1, wherein said backup means comprises at least one backup surface which includes a normal surface portion arranged closer to said click member and a slightly retreated surface portion arranged farther from said click member, said backup means being selectively operable to assume a first position in which said normal surface portion backs up said rolling element to completely prevent retreating movement thereof as well as a second position in which said retreated surface portion backs up said rolling element while allowing said limited retreating movement thereof.

3. The lever assembly as defined in claim 2, wherein said retreated surface portion is provided by a shallow recess formed in said backup surface.

4. The lever assembly as defined in claim 1, wherein said lever is rendered pivotable within a limited range while said rolling element is maintained in clicking engagement with any one of said clicking recesses.

5. The lever assembly as defined in claim 4, wherein said boss portion of said lever is substantially co-rotatable wit but slightly rotatable relative to said click member.

6. The lever assembly as defined in claim 5, wherein said click member is formed with at least one engaging tongue, and said bore of said boss portion is formed with at least one engaging groove for receiving said tongue, said groove being slightly larger in circumferential length than said tongue.

7. The lever assembly as defined in claim 1, wherein said click member is formed with at least one additional arcuate series of clicking recesses in different number and region from the first mentioned series of clicking recesses, said retainer means holding at least one additional rolling element in facing relation to said additional series of clicking recesses, said backup means being selectively operable to assume a first position for backing up said first mentioned rolling element as well as a second position for backing up said additional rolling element.

8. The lever assembly as defined in claim 2, wherein said click member is formed with at least one additional arcuate series of clicking recesses in different number and region from the first mentioned series of clicking recesses, said retainer means holding at least one additional rolling element in facing relation to said additional series of clicking recesses, said backup means further being selectively operable to assume a third position in which said normal surface portion backs up said additional rolling element as well as a fourth position in which said retreated surface portion backs up said additional rolling element.

9. The lever assembly as defined in claim 2, wherein said friction imparting means is selectively operable to impart said rotational friction when said backup means assumes said second position, but not to impart said rotational friction when said backup means assumes said first position.

10. The lever assembly as defined in claim 1, wherein said backup means is selectively operable to assume a first position for backing up said rolling element as well as a second position for allowing said rolling element to retreat completely out of clicking engagement with said series of clicking recesses.

11. The lever assembly as defined in claim 1, wherein said friction imparting means comprises a presser member for applying an axial pressure against one side of said boss portion of said lever.

12. The lever assembly as defined in claim 1, further comprising a lever mount non-rotatably fitted on said support shaft, said boss portion of said lever being rotatably fitted on said lever mount.

13. The lever assembly as defined in claim 12, wherein said lever mount has a first cylindrical portion and a second cylindrical portion adjacent said first cylindrical portion, said boss portion of said lever being rotatably fitted on said first cylindrical portion, said click member being in the form of a click ring arranged within said bore of said boss portion to rotatably fit on said second cylindrical portion, said click ring being spring-biased toward said backup means.

14. The lever assembly as defined in claim 13, wherein said lever mount further includes a first splined portion adjacent said second cylindrical portion, and a second splined portion adjacent said first splined portion but located outside said boss portion of said lever, said retainer means being in the form of a retainer disc non-rotatably but slidably fitted on said first splined portion, said friction imparting means is in the form of a presser member non-rotatably but slidably fitted on said second splined portion, said presser member upon sliding movement on said second splined portion toward said boss portion causing said retainer disc to slide on said first splined portion to apply an axial pressure against one side of said boss portion.

15. The lever assembly as defined in claim 14, further comprising a clamping bolt having a shank screwed to said support shaft, and a head engaging said presser member for causing it to slidably move toward said boss portion of said lever when said clamping bolt is tightened.

16. The lever assembly as defined in claim 14, wherein said backup means is in the form of a mode selector mounted on said presser member, said mode selector being lockably rotatable relative to said presser member.

17. The lever assembly as defined in claim 16, wherein said mode selector comprises an operating ring lockably rotatable on said presser member, and a control plate engaging said operating ring for co-rotation therewith, said control plate being interposed between said retainer disc and said presser member, said control plate providing at least one backup surface which includes a normal surface portion arranged closer to said click ring and a slightly retreated surface portion arranged farther from said click ring, said mode selector being rotationally lockable at a first position in which said normal surface portion backs up said rolling element to completely prevent retreating movement thereof as well as at a second position in which said retreated surface portion backs up said rolling element while allowing said limited retreating movement thereof.

18. The lever assembly as defined in claim 17, wherein said first splined portion of said lever mount provides spline end faces, said control plate has an opening formed with inward tongues in corresponding arrangement to said spline end faces, said inward tongues coming into abutment with said spline end faces to prevent said presser member from slidably moving toward said boss portion when said mode selector is locked at said first position, said inward tongues being located clear of said spline ed faces to enable said control plate to slide onto said first splined portion in response to sliding movement of said said presser member toward said boss portion when said mode selector is locked at said second position.

19. The lever assembly as defined in claim 17, wherein said presser member is externally formed with a positioning protrusion, and said operating ring of said mode selector is internally formed with a plurality of circumferentially spaced positioning recesses, said positioning protrusion being elastically engageable with a selected one of said positioning recesses.

20. A bicycle speed change lever assembly comprising:
   a support shaft;
   a click member supported by said support shaft and formed with at least one arcuate series of clicking recesses;
   retainer means supported by said support shaft and holding at least one rolling element in facing relation to said series of clicking recesses;
   a control lever pivotally supported by said support shaft and always subjected to a tension tending to pivot said lever in one direction, pivotal movement of said lever causing relative rotation between said click member and said retainer means;
   backup means arranged for backing up said rolling element on one side of said retainer means away from said click member, said backup means being capable of providing a half-click mode wherein said backup means allows said rolling element to limitatively retreat from said series of clicking recesses while also preventing said rolling element from retreating out of clicking engagement with said series of clicking recesses; and
   friction imparting means capable of imparting to said lever a rotational friction enough to overcome said tension.

* * * * *